United States Patent [19]

Gutman

[11] Patent Number: 5,219,389
[45] Date of Patent: Jun. 15, 1993

[54] GEAR TESTER CONTROLLING SELECTED DEGREES OF FREEDOM
[75] Inventor: Yevsey Gutman, Minneapolis, Minn.
[73] Assignee: Gei Systems, Inc., Minneapolis, Minn.
[21] Appl. No.: 929,835
[22] Filed: Aug. 12, 1992
[51] Int. Cl.⁵ .................. G01M 13/02; B23Q 3/04; B23Q 3/06; B23Q 1/04
[52] U.S. Cl. .................. 73/162; 33/501.13; 33/573; 269/71; 269/73
[58] Field of Search .............. 33/501.13, 573; 73/162; 269/71, 73

[56] References Cited

U.S. PATENT DOCUMENTS

| | | | |
|---|---|---|---|
| 1,981,693 | 11/1934 | Firestone et al. | 33/501.13 |
| 3,099,901 | 8/1963 | Hunkeler | 51/26 |
| 3,176,512 | 4/1965 | Hediger | 73/162 |
| 3,321,840 | 5/1967 | Pedersen | 33/179.5 |
| 3,404,443 | 10/1968 | Cinanni | 29/90 |
| 3,496,490 | 2/1970 | Weinert et al. | 33/501.13 |
| 3,528,286 | 9/1970 | Bergemann et al. | 73/162 |
| 3,583,072 | 6/1971 | Muller | 33/501.13 |
| 3,604,120 | 9/1971 | Muller | 33/501.13 |
| 3,611,800 | 10/1971 | Howlett et al. | 73/162 |
| 3,686,801 | 8/1972 | Ellwanger | 51/215 R |
| 3,712,000 | 1/1973 | Spear | 51/287 |
| 3,717,958 | 2/1973 | Ellwanger et al. | 51/26 |
| 3,795,143 | 3/1974 | Deprez et al. | 73/162 |
| 3,829,978 | 8/1974 | Basin et al. | 269/71 |
| 3,990,689 | 11/1976 | Eklund, Sr. | 269/71 |
| 4,024,757 | 5/1977 | Raess et al. | 73/162 |
| 4,193,317 | 3/1980 | Oono et al. | 269/71 |
| 4,262,891 | 4/1981 | Kinney | 269/71 |
| 4,317,560 | 3/1982 | Troyer | 269/71 |
| 4,502,457 | 3/1985 | Marron | 269/71 |
| 4,571,799 | 2/1986 | Chitayat | 269/71 |
| 4,618,256 | 10/1986 | Bartolomeo | 356/23 |
| 4,682,766 | 7/1987 | Barkley | 269/71 |
| 4,705,447 | 11/1987 | Smith | 269/71 |
| 4,767,109 | 8/1988 | Raketich | 269/71 |
| 4,822,014 | 4/1989 | Buchler | 269/71 |
| 4,831,872 | 5/1989 | Huang et al. | 73/162 |
| 4,896,869 | 1/1990 | Takekoshi | 269/71 |
| 5,105,552 | 4/1992 | Bielle | 33/573 |

FOREIGN PATENT DOCUMENTS

| | | | |
|---|---|---|---|
| 2815407 | 10/1979 | Fed. Rep. of Germany | 269/71 |
| 0250988 | 10/1987 | Fed. Rep. of Germany | 33/501.13 |
| 0448403 | 3/1950 | Italy | 33/501.13 |
| 0073680 | 6/1978 | Japan | 269/71 |
| 0093325 | 7/1981 | Japan | 269/71 |
| 0171229 | 10/1983 | Japan | 269/73 |
| 0188037 | 8/1986 | Japan | 269/71 |
| 0180447 | 8/1962 | U.S.S.R. | 33/501.13 |
| 0373568 | 6/1973 | U.S.S.R. | 73/162 |
| 0681719 | 10/1952 | United Kingdom | 73/162 |
| 0869771 | 6/1961 | United Kingdom | 73/162 |

OTHER PUBLICATIONS

Oerlikon Spriomatic contex T20 CNC Bevel and Hypoid Gear Tester by Dr. Hermann J. Stadtfeld, Dec. 1990.
Gleason No. 512 Hypoid Tester, Nov. 1969.
Bevel Gear Lapping Machines LKR 851 and LKR 1600, as well as Bevel Gear Running Testers GKP 851 and GKP 1600 by Klingelnberg (Date Unknown).
Bevel Gear Running Testers by Klingelnberg (Date Unknown).
General Line Brochure, The Gleason Works, 1990.
The Institute of Mechanical Engineers, *A Platform with Six Degrees of Freedom*, by D. Steward, Proceedings 1965-66-vol. 180, Part 1, No. 15 (1965).
*Understanding the 513 Bevel Gear Test Machine*, The Gleason Works, pp. 1-1, 4-2 through 4-3 and accompanying figures (Date Unknown).

Primary Examiner—William A. Cuchlinski, Jr.
Assistant Examiner—Diego F. F. Gutierrez
Attorney, Agent, or Firm—Kinney & Lange

[57] ABSTRACT

A gear suspension system is disclosed that permits movement of a gear, such as a spiral bevel or hypoid gear relative to its pinion with up to four degrees of freedom. Specifically, the gear suspension system includes a support frame with a movable carriage mounted thereon. The carriage includes a lower carriage member connected to an upper carriage member with suspension struts. The gear is mounted to the upper carriage member for rotation about a central axis. Actuators connected to the lower carriage member adjust the gear mounting distance and the shaft angle between the pinion and the gear, while actuators mounted to the upper carriage member adjust the H and V positions of the pinion relative to the gear.

14 Claims, 4 Drawing Sheets

GEAR TESTER CONTROLLING SELECTED DEGREES OF FREEDOM

CROSS-REFERENCE TO RELATED APPLICATIONS

Reference is made to my co-pending applications Ser. No. 07/928,808, filed Aug. 12, 1992 entitled GEAR TESTER WITH ACTUATOR SUPPORTED PLATFORM; Ser. No. 07/928,900, filed Aug. 12, 1992 entitled RIGID TEST TABLE FOR GEAR SETS; and Ser. No. 07/929,151, filed Aug. 12, 1992 entitled CONTROLLABLE GEAR TESTING SYSTEM.

BACKGROUND OF THE INVENTION

The present invention relates to a gear tester for controlling the vertical and horizontal positions of mating gears, such as hypoid or spiral beveled gears, verify the quality of a given gear set under fixed and known mounting conditions to determine sensitivity of the gears to various programmed misalignments, changes in mounting conditions and the like which simulate deflections during use.

In the prior art, it has long been the practice to test on a substantially 100 percent basis, spiral bevel and hypoid gears to determine running qualities, such as tooth-bearing contact. It has further been known to use machines for running sets of bevel or hypoid gears together to determine optimum running positions of one gear relative to another. Such a device is shown in U.S. Pat. No. 3,795,143. The device in this patent permits adjusting the axes of the pinion and gear relative to each other for the offset of axes, as well as the positioning of the degree of intersection of the gear. However, this procedure involves the use of large slides and manual controls for the final positioning.

In order to determine the effect of various tolerances or differences in gear and pinion positions, the need has existed for accurately controlling the position of the gear in several degrees of freedom, while determining loads on the gears as well as simultaneously determining other performance factors of the gears. Such performance factors may be noise, the "footprint" of the pinion on the gear, and deflections that might occur on the gear itself caused by loading on the gear. Thus, measuring the loads on the gear in the controlled degrees of freedom is beneficial in determining factors that may be necessary for housing designs to minimize deflections and alignment problems.

Finally, in matched sets of gears, an optimum running position of pinion and the gear can be determined and used for final adjustment when assembled in a housing for use so that other than the nominal axial offset and positioning of the gears can occur.

SUMMARY OF THE INVENTION

The present invention provides for a gear suspension system that permits movement of a gear (a ring gear), such as a spiral bevel or hypoid gear relative to its pinion in two degrees of freedom, commonly known as a hypoid offset and pinion axial position. The invention permits the computerized control of servo actuators in response to input positioning control signals, and changing the control signals while the pinion is being powered to rotate the gear. The system is further controllable to obtain two additional degrees of freedoms, commonly known as the gear mounting distance and the shaft angle. In addition, the gear can be loaded in a suitable manner, such as by a brake, for testing under a load.

Although the present invention will be described with respect to a hypoid or spiral bevel gear tester, principals forming the present invention are equally suited for testing other types of gears. Therefore, it is to understood that the present invention is not limited to nor intended to be limited to a gear tester for hypoid or spiral bevel gears.

The system permits determining whether the gears are properly mating when set at a nominal setting. The apparatus permits controlling the hypoid or spiral bevel offset, which is the offset of the pinion axis from the gear axis in the plane passing through the gear axis and parallel to the spindle rotational axis, commonly called a vertical position ("V"); and the position of the gear axis along the pinion axis, which is commonly called the pinion axial position ("H") and can generally be referred relative to a reference plane perpendicularly to the pinion spindle axis, generally the plane surface supporting the back surface of the pinion. In other words, the distance of the gear axis from the reference plane at the pinion support surface is the pinion axial position, H. The terminology for horizontal and vertical positions are traditional references used in describing relative pinion and gear positions and are not intended to be limitations of the present invention.

Further control of the apparatus provides two additional degrees of freedom. Specifically, the apparatus permits controlling movement of the gear along the gear rotational axis, which position is essentially the gear mounting distance, that determines the backlash ("Q"); and controlling the shaft angle ("S"), which is the angle of the axis of the gear shaft or spindle relative to the axis of rotation of the pinion.

The present invention achieves these mounting conditions by providing a pinion spindle housing which is mounted on a mounting assembly that will permit movement of the pinion along the pinion shaft or spindle axis, and also will permit movement in a direction perpendicular thereto. The pinion spindle housing is movable relative to a main support table as to which the gear support is mounted for its necessary degrees of freedom. A unique linkage arrangement utilizing several controlled actuators which can be operated in response to digital overall controls in a known manner is provided for precisely relating the position of the gear to the pinion and determining necessary gear mating factors. The computer controls also can control the speed of rotation of the pinion and thus the gear, the load applied to the gear, and feedback devices are provided for determining the position of the various actuators. Torque sensing also can be provided for determining the loads on the gears.

DETAILED DESCRIPTION OF THE PREFERRED EMBODIMENTS

Figure 1:
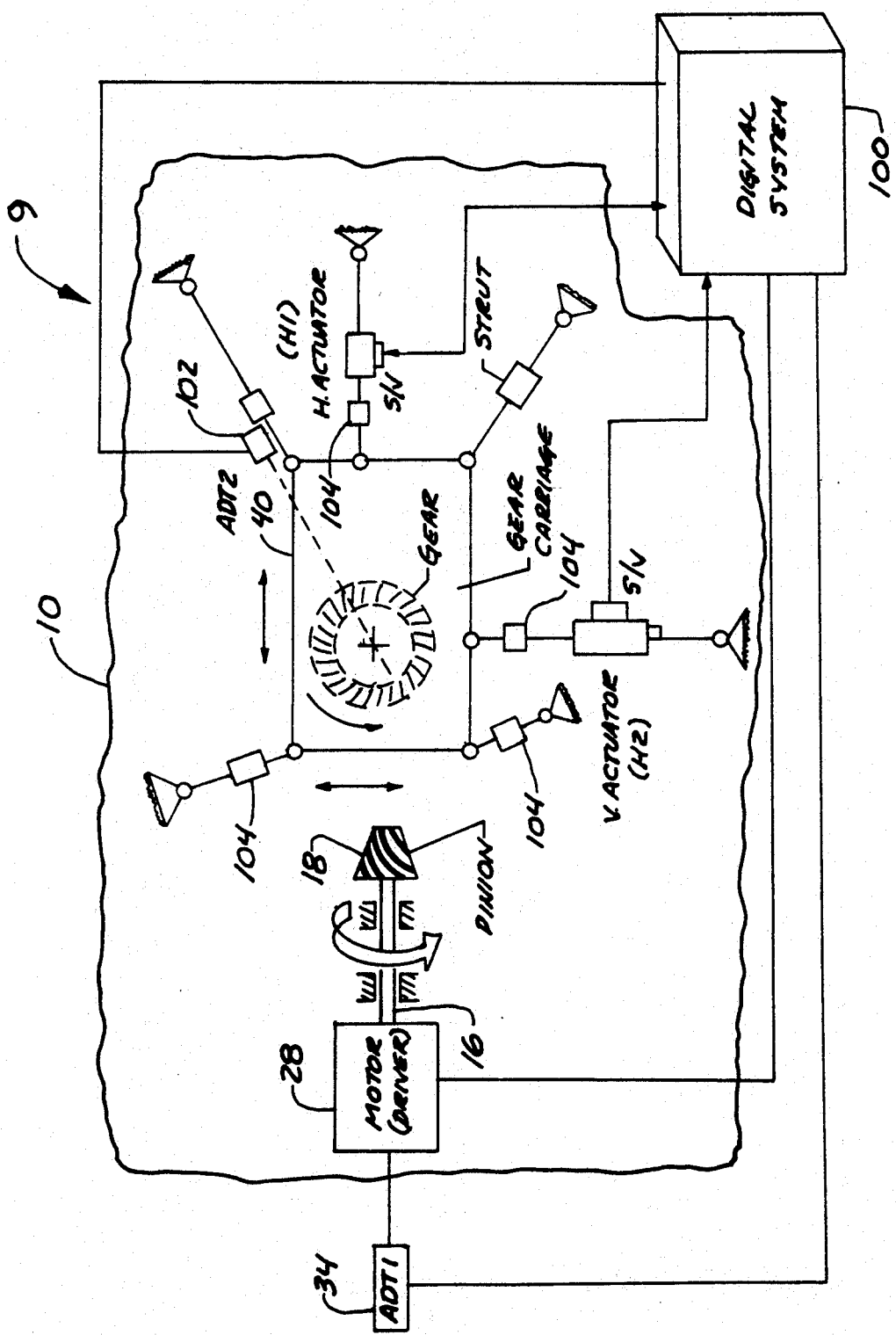
FIG. 1 is a schematic representation of a gear testing system utilizing up to four degrees of freedom for the gear support relative to the pinion and incorporating the features of the present invention.
Figure 2:
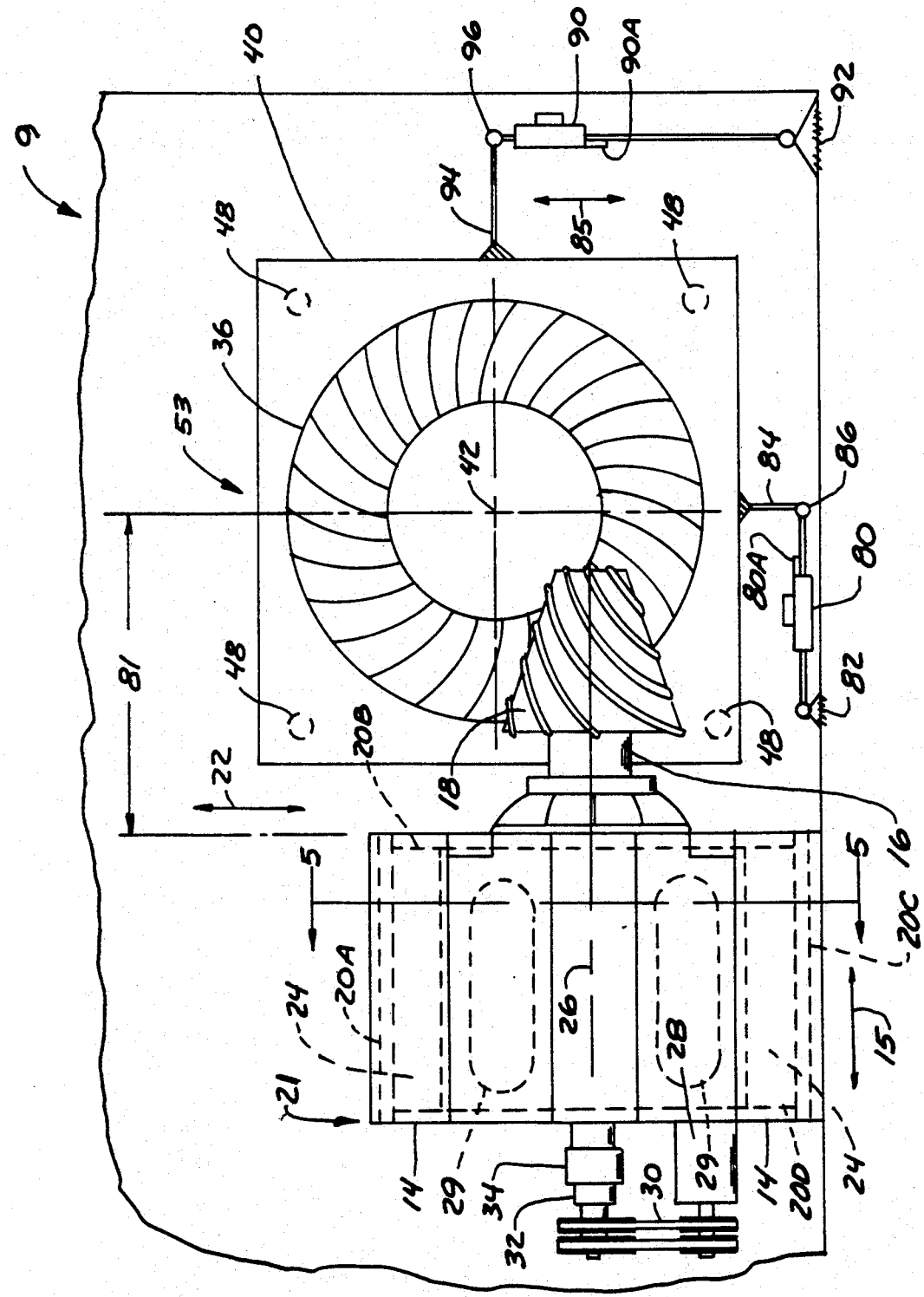
FIG. 2 is a schematic top plan view of the tester of FIG. 1.
Figure 3:
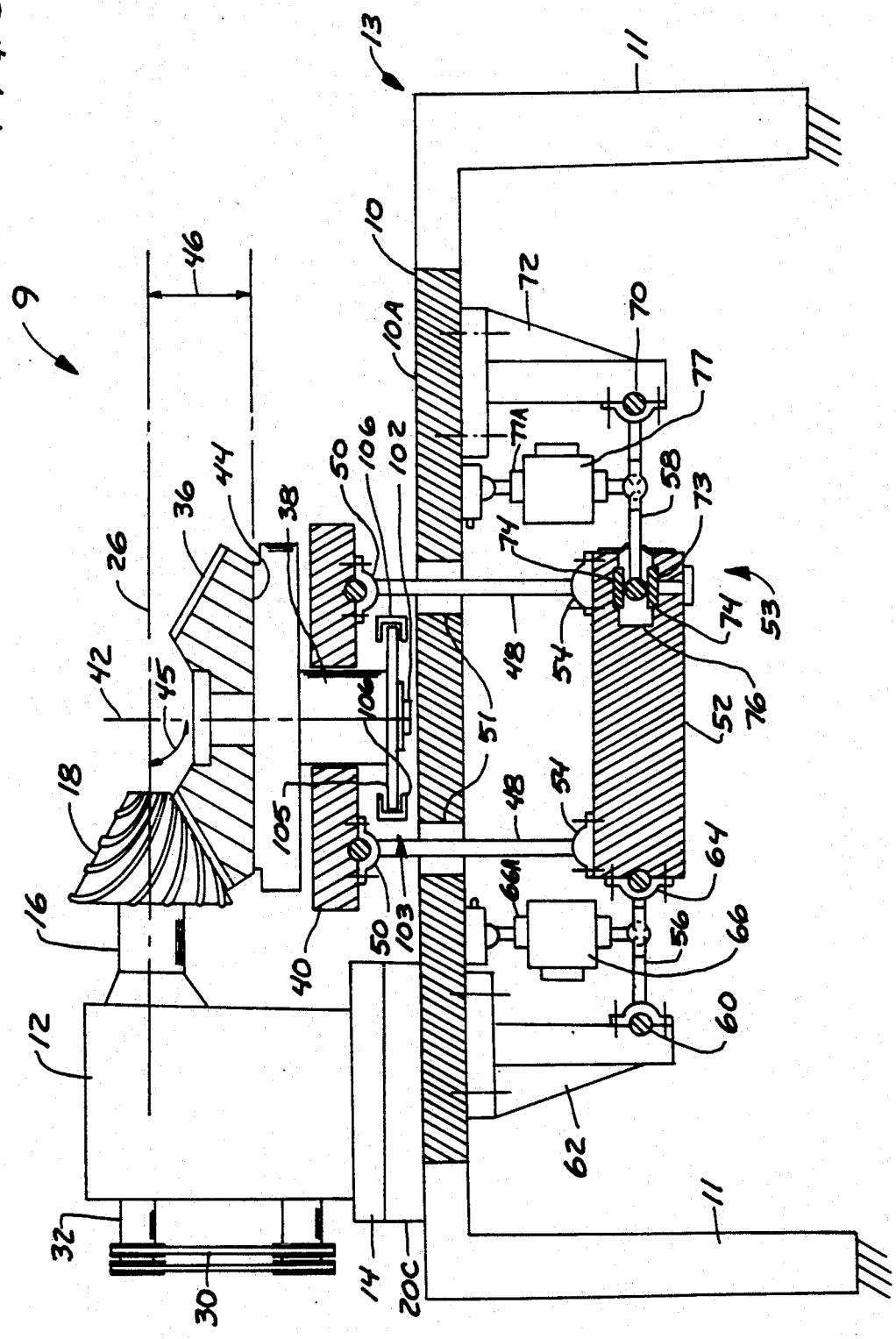
FIG. 3 is a side-view of the device of FIG. 2 with parts in section and parts broken away.

A gear tester of the present invention is schematically illustrated in FIGS. 1-3 generally at 9. A support frame or table 10 is mounted on suitable pedestals 11, to make a stable platform 13 for elements of the present invention. The platform 13 supports a pinion spindle housing 12 for movement in two mutually perpendicular axes in a plane parallel to an upper surface 10A of the table 10 to obtain a coarse setting of the pinion.

When the gear testing system such as that shown in the present disclosure is initially set up, the procedure has to be considered as a two step operation. First, there are coarse settings which would establish relative orientation of the pinion axis versus the gear axis. For the pinion, this setting involves positioning the pinion housing 12 on the table 10. Whereas, the coarse setting for the gear is the height of the gear arbor. In these positions, the pinion and gear are close enough to the desired positions of the pinion and gear spindle to permit the gears to run. Since the accuracy of these settings is not very high, further adjustment is required to improve the relative position of the gears. This is done by a second positioning procedure called the fine settings movement. The operator has to establish the amount of movement to be produced by the fine setting mechanism upon the gear and thus has to determine the deviation of the setting after the coarse adjustment. The gear positions have to be measured and compared with the desired position. Both the coarse settings and the fine settings are described in detail in my co-pending application entitled CONTROLLABLE GEAR TESTING SYSTEM filed the same day as the present application and which is hereby incorporated by reference.

Figure 5:
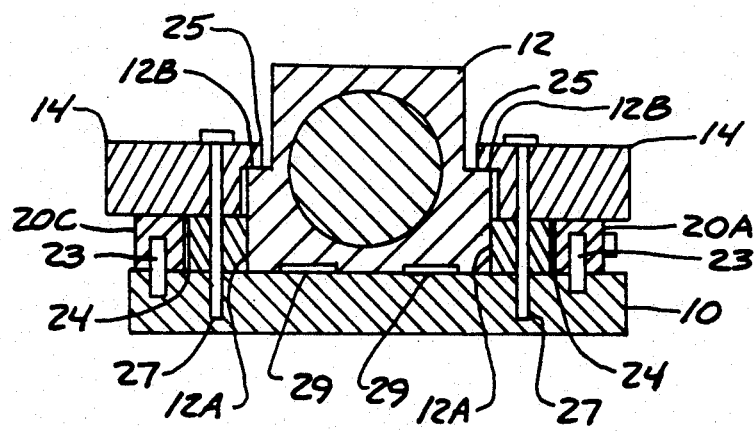
FIG. 5 is a sectional view of a portion of the tester taken along line 5—5 in FIG. 2.

Referring to FIGS. 2 and 5, the pinion spindle housing 12 is located within four guide rails 20A, 20B, 20C and 20D that are connected together to form a guide rail frame 21. The guide rail frame 21 is secured to the table 10 with mounting pegs 23. Replaceable spacer bars 24 disposed between side edges 12A of the pinion spindle housing 12 and the side guide rails 20A and 20C orient the pinion spindle housing 12 substantially parallel to a longitudinal axis 26 of a pinion spindle 16 and pinion 18. Typically, the pinion 18 and its spindle 16 are manufactured as a single piece.

Clamping bars 14 positioned over the side guide rails 20A and 20C and the spacer bars 24 secure the pinion spindle housing 12 to the table 10. Each clamping bar 14 includes an extending edge 25 that engages corresponding flanges 12B of the pinion spindle housing 12. Mounting bolts 27 through the clamping bars 14 and the spacer bars 24 secure the position of the pinion spindle housing 12 to the table 10. As illustrated, sufficient contact between the clamping bars 14 and the pinion spindle housing 12 is maintained on flanges 12B, while allowing the spacer bars 24 to be replaced when desired to allow transverse positioning of the pinion spindle housing 12 in the directions indicated by double arrow 22. In addition, the pinion spindle housing 12 has a longitudinal length less than the distance between guide rails 20B and 20D to allow longitudinal positioning of the pinion spindle housing 12 in the directions indicated by double arrow 15.

In the embodiment as illustrated, positioning of the pinion spindle housing 12 is made easier through pneumatic lifts. With the clamping bars 14 removed, air from a suitable compressor, not shown, is forced into recesses 29 formed within the base plate of the pinion spindle housing 12. The forced air within recesses 29 causes upward movement of the pinion spindle housing 12, allowing convenient relocation of the pinion spindle housing 12 on the table 10. When the desired position of the pinion spindle housing 12 has been obtained, air pressure is removed within recesses 29 to lower the pinion spindle housing 12 onto the table 10. As described above, suitable spacer bars 24 are then located between the pinion spindle housing 12 and the guide rails with the clamping bars 14 securing the assembly to the table 10.

Pinion spindle housing 12 further carries a motor of suitable power indicated generally at 28, which in turn drives a pulley and belt drive 30 to drive a shaft 32 that is coupled to the pinion spindle 16. An optical shaft speed encoder 34 is provided to determine the pinion spindle 16 rotational speed. The motor 28 is controllable as to speed, through controls of which will be explained below, and has adequate power to load the pinion 18 as well as a gear indicated generally at 36, that are to be tested.

Referring to FIG. 3, the gear 36 is mounted to a gear spindle 38 in a suitable way, while the gear spindle 38 is mounted in a gear carriage 40 using suitable bearings. The gear carriage 40 is independent of the frame 10, but is supported relative thereto, and in this instance the gear carriage 40 is supported with up to four degrees of freedom relative to the fixed position of the pinion 18, after nominal settings have taken place.

The gear 36 has a central axis 42 that is the center of the gear spindle 38, which is offset from the axis 26, as illustrated in FIG. 2. A gear pack surface indicated at 44 of gear 36 is also mounted by a distance 46 from the pinion axis 26 The distance indicated by the arrow 46 is commonly known as the gear mounting distance. An angle, indicated by arrow 45, between the gear axis 42 and the plane containing the pinion axis 26 is known as the shaft angle.

Referring to FIGS. 2 and 3, the gear carriage 40 is supported on four individual struts 48 at the four corners of the gear carriage 40. Struts 48 are pivotally mounted onto the gear carriage 40 with universal pivotal connections 50. At ends opposite carriage 40, the struts 48 are connected to a lower carriage 52 with suitable pivot connections 54 to form a gear system carriage 53. The struts 48 pass through clearing openings 51 in the frame 10.

Figure 4:
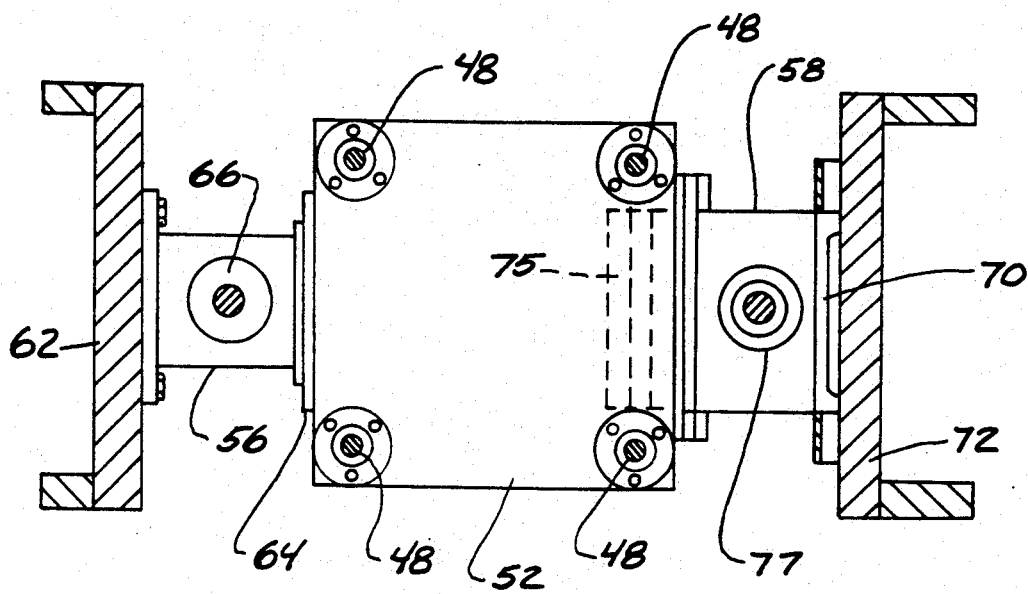
FIG. 4 is a sectional view taken generally along line 4—4 in FIG. 3.

Gear carriage 40 is guided by a pair of stiff pivoting links 56 and 58 illustrated in FIGS. 3 and 4. Link 56 is pivotally mounted about an axis that is generally parallel to the plane of surface 44, as shown at 60. The end of the link 56 is in turn supported back to the platform 13 with a standoff mount 62. The opposite end of the link 56 is pivotally mounted about an axis generally parallel to the axis 60 with a connection joint shown at 64.

A servo-controlled actuator 66 controls movement of the link 56 about the axis 60 and 64. The servo-controlled actuator 66 has one end connected to the underside of the frame 10, and the other end pivotally mounted to the link 56.

The link 58 has one end pivotally mounted at connection 70 to a frame standoff 72, and has its other end universally pivotally and slidably mounted on one or more suitable slide members 73 that are guided in pads 74, which in turn are supported in a slot 76 in the lower carriage 52. The sliding movement is needed as orientation of the lower carriage 52 may change during use. An actuator 77 is used for controlling pivotal movement of the link 58 about an axis of pivot connection 70, which also controls the axial movement of the struts 48 connected to lower carriage 52.

The struts 48 transfer the displacement of lower carriage 52 to the gear carriage 40. The struts 48 can be adjustable in length for an initial setting, to calibrate the system. The spherical joints 50 and 54 are positioned at each end of each strut 48 for relative movement between the gear carriage 40 and the lower carriage 52, as desired.

In order to obtain the two degrees of freedom for the gear systems carriage 53, two actuators are required. These actuators operate in a plane parallel to the surface 44, and are shown in FIG. 2 schematically. A servo-valve controlled actuator 80 is connected as at 82 to the frame 10. The actuator 80 has a rod end 86 that is universally pivotally mounted to a bracket 84. The bracket 84 is fixed to the gear carriage 40. The actuator 80 controls movement of the gear system carriage 53, specifically, the carriage 40, in a direction indicated by arrow 81 which is the distance of the gear axis 42 from a reference plane at the pinion support surface 83 typically referred to as the H position.

An actuator 90 is mounted as at 92 to the frame 10. The actuator 90 controls movement in the direction indicated by arrow 85, which is the offset of the pinion axis 26 relative to the gear axis 42 typically referred to as the V position or hypoid offset. The actuator 90 is also connected to a bracket 94 which is fixed to the gear carriage, as at 96, and when the actuator is operated through a servo-control and servo-valve which is well known, it can change, modify, and set the V position of the pinion, relative to the gear 36.

The ability to control the V position of the gear carriage 40 relative to the pinion spindle 16 and thereby dynamically adjust the shaft angle and the gear mounting distance 46 can be accomplished through the actuators 66 and 77. For example, simultaneous, equal operations or displacement of the actuators 66 and 77 in the same directions will cause movement of the gear system carriage 52 up or down, which in turn decreases backlash ("Q") 46, respectively. Whereas, differential operation or displacement of the actuators 66 and 77 in opposite directions will cause rotation of the gear system carriage 52, thereby adjusting the shaft angle 45. Thus, the entire lower carriage 52 can be positioned in space through the use of links 56 and 58. The movement and location of the pivot axis 64, which will move parallel to itself in an arc around the axis 60, and the angular position of the lower carriage 52 about the axis 70 is controlled by the actuator 76. Adjustment of the shaft angle 45 and the backlash or gear mounting distance 46 are two additional degrees of freedom for the gear system carriage 53.

It should be noted that there exists crosstalk, so that when the gear carriage 40 is moved by either actuators 80 or 90, the gear carriage 40 will move in a type of arc because of the struts 48, and thus the compensation by the actuator 66 and 76 must take place to correct the gear carriage 40 position and provide for proper backlash control between the pinion 18 and the gear 36. A digital control system indicated generally at 100 in FIG. 1 is used for controlling the various servo-valves to the actuators as well as speed control to motor 38 and brake loading on the gear 36 to be described below.

As stated, the shaft angle S is controlled by differential movement of the actuator 66 and 76, the backlash Q is controlled by simultaneous movement of actuators 66 and 76, hypoid offset change V is changed by the actuator 90, and the pinion axis or pinion mounting distance H is determined by the actuator 80. The relationship can be symbolically written as:

$V = V(u_1, u_2, u_3, u_4)$ $H = H(u_1, u_2, u_3, u_4)$ $Q = Q(u_1, u_2, u_3, u_4)$ $S = S(u_1, u_2, u_3, u_4)$

Where $u_1, u_2, u_3, u_4$ are the strokes of actuators 66, 76 and 80 and 90, respectively. The inverse relationship can be written symbolically as:

$u_1 = u_1(V, H, Q, S)$ $u_2 = u_2(V, H, Q, S)$ $u_3 = u_3(V, H, Q, S)$ $u_4 = u_4(V, H, Q, S)$

The position of each actuator is defined by a built-in LVDT or position sensor, which is used as a feedback sensor. These sensors are shown schematically at 66A, 77A, 80A and 90A.

In addition to positional sensors, rotational sensors are provided to measure rotation of the pinion 18 and gear 36. The pinion encoder 34 has been previously described and determines the pinion 18 rotational speed. The gear spindle 38 has an optical encoder indicated schematically at 102 in FIG. 3. The spindle 38 further includes a brake assembly, which is shown schematically at 103 comprising a brake disk 105 and calipers 106. The feedback signals provided to the digital system 100 from the pinion sensing encoder 34 and the gear sensing encoder 102 are used as system parameters for controller 100 which then can place loads on the gears through brake assembly 103 or adjust the speed of the gears through motor 28 for adequate testing.

The coarse settings or nominal settings of Q, S, V and H between the pinion 18 and the gear 36 are provided by movement of the stationary pinion utilizing the pinion spindle mounting assembly previously described. Additionally, each of the actuators and the struts can include load cells as shown schematically in FIG. 1. These load cells are indicated generally at 104 and can be used for determining the individual loads applied by each of the actuators and carried by each of the individual struts.

A network to the digital controller 100 can be applied. The optical encoders 34 and 102 measure the transmission errors, and accelerometers can be utilized to measure vibration. Microphones can be used to analyze the acoustic noise, and different positions of the gear 36 relative to the pinion 18 can be tried with different results being recorded. In this manner gear sets can be provided with specific mounting positions for minimizing noise, and comparative tests also can be run to determine if one gear cutting machine, for example, is providing noisier or more vibration plague to gear sets than others.

Suitable standards, of course, can be applied so that the results can be compared.

It is common to control the input shaft for the pinion 18 as to its speed, and the gear spindle 38 is controlled as to load and torque. This can be done by the use of a braking device shown, or it could be a suitable dynamometer for loading the gear 36. When the brake calipers 106 are mounted to react the torque to the gear carriage 40, the actuators for H and V directions, namely actuators 80 and 90 will be used for reacting the torque. The brake calipers 106 can also be reacted back to the frame 10, through suitable universal couplings which would still permit the gear carriage 40 to move as explained above.

The gear spindle 38 is held always parallel to the gear carriage plane, and is moved in a dynamic manner in response to a program of remote parameters, for example, so that tooth pattern, noise, vibration and other factors can be evaluated. Further, gearbox deflections can be evaluated and simulated by movement of the aforementioned actuators.

Although the present invention has been described with reference to preferred embodiments, workers skilled in the art will recognize that changes may be made in form and detail without departing from the spirit and scope of the invention.

What is claimed is:

1. An apparatus for testing and adjusting a position of a first gear with respect to a second gear relative to three substantially orthogonal axes, the first gear driving the second gear with the first gear driven by a rotational drive, the apparatus comprising:
   a frame on which the first gear and the rotational drive are mounted;
   a carriage including:
      an upper carriage member supporting the second gear for rotation about a rotational axis;
      a lower carriage member; and
      at least one strut connected to the lower carriage member and the upper carriage member;
   adjusting means connected to the carriage for adjusting the linear position of the second gear with respect to the first gear along two of the substantially orthogonal axes; and
   sensing means for determining relative displacement of the second gear with respect to the first gear.

2. The apparatus of claim 1 wherein the adjusting means includes an actuator connected to the lower carriage member, and wherein displacement of the lower carriage member caused by the adjusting means is transferred to the upper carriage member by the strut.

3. The apparatus of claim 2 wherein the adjusting means comprises a second actuator connected to the lower carriage member, wherein simultaneous displacement of the actuator and the second actuator causes linear displacement of the second gear along one orthogonal axis, and differential displacement of the actuator and the second actuator causes angular displacement of the second gear about another orthogonal axis.

4. The apparatus of claim 1 wherein the adjusting means is connected to the upper carriage member.

5. The apparatus of claim 1 wherein the strut is universally pivotally connected to the lower carriage member and a third actuator and a fourth actuator are connected to the upper carriage member and the frame, the third and fourth actuators adjusting the linear positions of the second gear with respect to two substantially orthogonal axes.

6. The apparatus of claim 5 wherein the lower carriage member is supported below the frame, and wherein the upper carriage member is located above the frame with the strut passing through an aperture in the frame.

7. The apparatus of claim 6 and further comprising a plurality of struts connecting the lower carriage member to the upper carriage member.

8. The apparatus of claim 1 and further comprising loading means connected to the second gear to apply selective brake loads.

9. The apparatus of claim 1 and further comprising control means connected to the adjusting means and to the sensing means, the control means controlling displacement of the second gear.

10. An apparatus for testing and adjusting a position of a first gear with respect to a second gear relative to three substantially orthogonal axes, the first gear driving the second gear with the first gear driven by a rotational drive, the apparatus comprising:
    a frame on which the first gear and the rotational drive are mounted;
    an upper carriage member supporting the second gear for rotation about a rotational axis;
    a lower carriage member;
    a plurality of struts universally pivotally connected to the lower carriage member and the upper carriage member;
    adjusting means connected to the upper carriage member for adjusting the linear position of the second gear with respect to two substantially orthogonal axes; and
    sensing means for determining relative displacement of the second gear with respect to the first gear.

11. The apparatus of claim 10 wherein the adjusting means comprises a first actuator and a second actuator connected to the upper carriage member and the frame.

12. The apparatus of claim 11 and further comprising second adjusting means connected to the lower carriage member for adjusting the linear position of the second gear with respect to a third axis substantially orthogonal to the two orthogonal axes and the angular rotation of the second gear about one of the orthogonal axes.

13. The apparatus of claim 12 wherein the second adjusting means comprises a third actuator and a fourth actuator; and wherein simultaneous displacement of the third actuator and the fourth actuator causes linear displacement of the second gear along one orthogonal axis, and differential displacement of the third actuator and the fourth actuator causes angular displacement of the second gear about another orthogonal axis.

14. The apparatus of claim 13 and further comprising control means connected to the adjusting means, the second adjusting means and to the sensing means, the control means controlling displacement of the second gear.

* * * * *